APPARATUS FOR ANALOGICALLY CONVERTING BINARY CODED DECIMAL SIGNALS INTO DECIMAL DISPLAYS

Filed May 2, 1962

INVENTORS
EDWIN ELLNER
WILLIAM A. KNECHT
BY
Mandeville & Schweitzer
ATTORNEYS

United States Patent Office 3,234,546

Patented Feb. 8, 1966

3,234,546

APPARATUS FOR ANALOGICALLY CONVERTING BINARY CODED DECIMAL SIGNALS INTO DECIMAL DISPLAYS

Edwin Ellner, Oxford, and William A. Knecht, New Hartford, Conn., assignors to Consolidated Electronics Industries Corp., Waterbury, Conn., a corporation of Delaware Filed May 2, 1962, Ser. No. 191,895
12 Claims. (Cl. 340—347)

This invention relates to analog indicating devices and more specifically to a novel and improved converter for displaying a graphical decimal output corresponding to a binary coded decimal input.

As is well known to the art, binary numbers, or more specifically binary coded decimal signals, are inherently and readily adaptable to electronic computer applications. Conversion of binary coded decimal inputs to decimal output displays may be accomplished digitally through complex circuitry means or analogically by mechanical means. The present invention is primarily in the nature of an improvement in the latter, specifically employing electromechanical means, in lieu of purely electrical circuitry, to convert a binary coded decimal signal such as might be present at a four terminal array, for example, to its decimal equivalent.

The mechanism of the present invention provides a rapid, direct, and highly reliable means of efficiently translating parallel binary coded decimal voltages into corresponding graphic decimal displays. A significant feature of the invention is the provision of a memory system for preserving the output information even after the input signal or the actual power to the converter has been removed.

The concept of analogically converting binary coded decimal signals into decimal displays is not unknown to the art; however, the new and improved converter of the present invention, by virtue of its extremely compact and relatively uncomplex structure, provides great economies in production. Savings in assembly time and materials are affected through the reduction of the number of requisite parts and through the simplification of those parts. An analogical converter made in accordance with the principles of the present invention achieves the aforementioned economies without any sacrifice of efficiency and reliability.

Essentially the apparatus of the present invention comprises a housing, four similar solenoids which may be selectively energized by binary coded decimal signals, a readout drum, and a novel form of linkage connecting the drum and the solenoids. The displacement of the plunger of each of the solenoids is multiplied by a predetermined amount through leverages of the linkage system to give each solenoid a weighted displacement effect and thereby to affect a partial decoding of the coded input signal. In a system for decimal readout of numbers up to 10, the weighted displacement effects are in a ratio of 1, 2, 4, and 8 units (or 1, 2, 4, and 2 units). Advantageously, the novel linkage system, which establishes the effective 1:2:4:8 or "binary" proportionality of the solenoid plunger displacements, also performs the algebraic addition of the individual displacements. The total weighted displacement is the analogical equivalent of the binary coded decimal input; thus this summation of the displacements effectively decodes or converts the coded input into its corresponding decimal output.

By selectively energizing or pulsing the four solenoids with binary coded decimal signals, various combinations of displacements of the linkage totaling from 1 to 15 units and representing decoded equivalents of the coded binary input signals are attainable. However, in practical applications, employing decimal readout utilizing the characters "0"–"9," displacements of greater than nine units are, of course, not required.

It should be understood in this regard that by changing the input code and modifying the linkage system accordingly, the present invention may be employed with a permuted binary code. For example, using selective weighted displacements in the ratio of 1:2:2:4, decimal characters "0"–"9" can be attained. The operating principles for both the binary coded decimal and permuted binary decimal are the same; therefore, by way of explanation but not limitation, this invention will be described hereinafter in terms of a binary coded decimal input.

The output of the linkage system, the total weighted linear displacement of the four solenoids, is displayed graphically by a decimally calibrated readout drum. The drum is angularly displaced in direct proportion to the total linear displacement of the linkage system to display the analogically decoded value of the input voltage through a window in the housing. An appropriate driving connection, advantageously a gear sector directly geared to the drum, is used for this purpose.

In the mechanism of the invention, a memory system is incorporated into the converting apparatus and constitutes an advantageous, novel feature of the device. The memory system consists of a series of spaced stops on a movable (e.g., rotating) readout drum, each of which corresponds to a discrete integer or character to be displayed in the window, and a solenoid actuated, spring biased restraining arm. The restraining arm has the dual functions of cooperating with the stops, to insure proper drum alignment, and of holding the drum in its angularly displaced position, to preserve the displayed decimal output reading after the input voltage signal has been removed.

The restraining arm is spring biased toward the readout drum and selectively moved away from the drum by a release solenoid capable of overcoming the spring bias. The release solenoid is actuated and deactuated simultaneously with the input solenoids. This arrangement permits the drum to register and preserve a reading, enabling instantaneously achieved readings to be read after an event has occurred or after the signal has been removed. This feature is of paramount importance in many cases and finds increasing utility in a wide variety of applications, as for example, where an inordinate number of necessary instrument panel readings makes it impossible for an operator to record, simultaneously or in relatively short intervals of time, the instantaneous readings of complex processes or systems.

For a more complete understanding of the invention reference should be made to the accompanying drawing in which.

Figure 1:
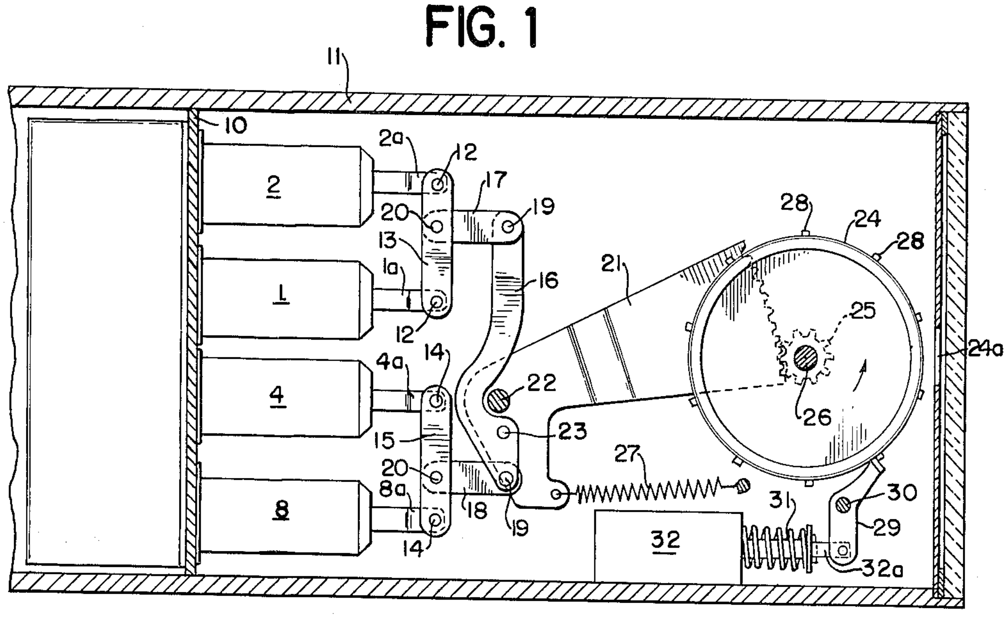
FIG. 1 is a side elevation of a mechanism for analogically converting a binary coded decimal signal to a decimal graphic display in accordance with the principles of the present invention.

Referring to FIG. 1, four similar input solenoids, designated by reference numerals 1, 2 4 and 8 are mounted on an end plate 10, of a housing 11, so that their respective plungers 1*a*, 2*a*, 4*a*, and 8*a* are aligned parallel to one another in the same plane. The reference numerals chose for the input solenoids conveniently correspond to the effective weighted values of the displacements of the solenoid plungers, which effective values are achieved through a novel linkage to be discussed hereinafter. The plungers are all of equal stroke and, as will be understood, are selectively energized to represent binary coded decimal numbers.

As is well known, in the binary system only two characters, 0 and 1, are used to represent numerical quantities. In the binary coded decimal system the two characters, or "bits" as they are sometimes called, are grouped into four "bit" minary numbers or "words" to respresent the decimal numbers 1–9, as follows:

| B.C.D. "words" | | Decimal number |
|---|---|---|
| 0000 | = | 0 |
| 0001 | = | 1 |
| 0010 | = | 2 |
| 0011 | = | 3 |
| 0100 | = | 4 |
| 0101 | = | 5 |
| 0110 | = | 6 |
| 0111 | = | 7 |
| 1000 | = | 8 |
| 1001 | = | 9 |

The aforementioned binary coded decimal words can in turn be easily represented by the presence or absence of electrical pulses at a four terminal array. Each of the four terminals, of course, represents a separate "bit" of the binary coded decimal values; namely, $2^0$ or "1"; $2^1$ or "2"; $2^2$ or "4"; and $2^3$ or "8." For example, the decimal number 1 is represented by a pulse at the "1" terminal and the absence of pulses at the "2," "4," and "8" terminals; the decimal number 2 by a pulse at the "2" terminal only; the decimal number 3 by simultaneous pulses at the "1" and "2" terminals only; the decimal number 7 by simultaneous pulses at the "1," "2," and "4" terminals only; and so forth. Thus selective energization of the "1," "2," "4," and "8" terminals can be used to provide an analogical representation and summation of those individual values, permitting the rapid conversion of binary coded decimal signal equivalent to the numerals 1 through 9.

The linkage of the present invention serves dual functions, one of which is to give the required effective weight in the binary 1:2:4:8 ratio to the displacements of the plungers, it being understood that the actual strokes of all the plungers advantageously are the same. Additionally, the linkage algebraically adds the effectively weighted displacements to give a total mechanical displacement which represents analogically the decoded decimal output of the electrical binary coded decimal input.

Specifically, the solenoid plungers 1*a* and 2*a* are pivotally connected by pins 12 to a cross link 13, while the plungers 4*a* and 8*a* are similarly connected by pins 14 to a cross link 15. An integrating link 16 is pivotally joined to thet cross links 13, 15 by means of connecting links 17, 18 which pivotally engage the integrating link and cross links by means of connecting pins 19, 20, respectively. The connection points formed by the pins 20 divide cros links 13, 15 in a 1:2 ratio as illustrated in FIG. 1.

The mechanical displacement of the integrating link is transmitted through a sector gear lever 21 which is angularly driven about a pivot rod 22 through a pin connection 23 to the integrating lever. The pinned joint 23 advantageously divides the length of the integrating link 16 into a 1:4 ratio.

Selective energizing of one or more of the input solenoids 1, 2, 4, 8 will cause the folowing sequential action of the linkage: At least one cross link will be displaced either pivotally (if only one connected solenoid is energized) or bodily (if both connected solenoids are energized) and the movement of the cross link will displace the connecting link engaged therewith to correspondingly displace the integrating link 16. The integrating link displacement will then cause an angular displacement of the sector gear lever 21 in an amount corresponding analogically to the coded electrical input to the solenoids 1, 2, 4, 8 or, more specificaly, equivalent to the sum of the individual effectively weighted solenoid displacements. It is, of course, to be understood that the sequence described takes place substantially instantaneously, the inertia of the components being the only limiting factor as to the ultimate speed of operation.

Figure 2:
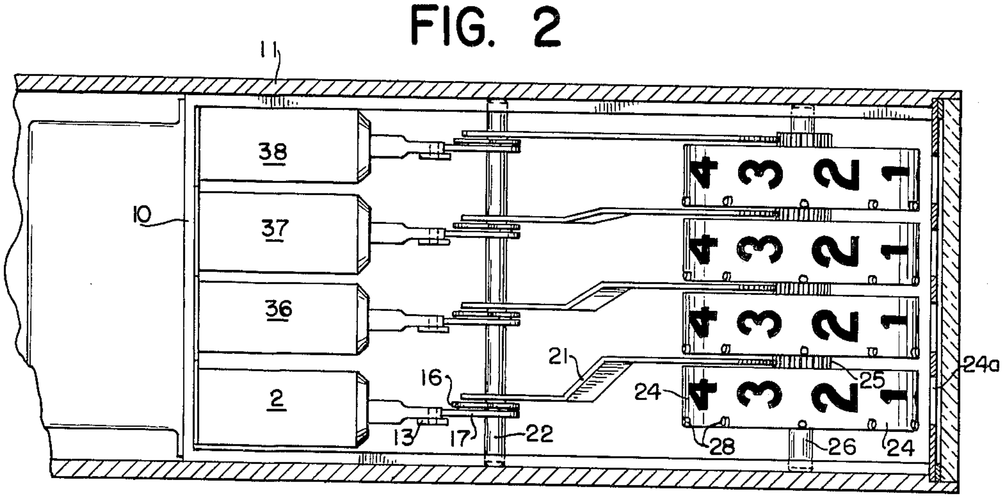
FIG. 2 is a plan view of a series of mechanisms of the type illustrated in FIG. 1, appropriately aligned to provide a binary coded decimal to decimal converter with "units," "tens," "hundreds," and "thousands" readout displays.

The sector gear lever 21 drives a decimally calibrated readout drum 24 through a gear 25 mounted coaxially on the readout drum for rotation on a shaft 26. The readout drum 24, as best seen in FIG. 2, is calibrated from zero to nine, the individual characters being readily visible through a window 24*a* in a front panel of the housing. In the illustrated configurations of FIGS. 1 and 2, the input solenoids are deenergized and the drums 24 are in the "zero" position.

It will be best seen from FIG. 1 that displacement of any one of the plungers will cause the counterclockwise rotation of the readout drum, the amount of rotation being the analogical equivalent output of the binary coded decimal input. A zeroing spring 27 is advantageously provided to urge the drum through the sector gear lever 21 in a clockwise direction back to the "zero" position after the input solenoids have been deenergized.

An advantageous feature of the present invention is the memory system which provides for the preservation of the output information after the removal of the input signal by the deenergization of the input solenoids. To this end, the readout drum 24 is provided with ten stop lugs 28, each of which represents a decimal position from zero to nine. A restraining arm 29, pivotally mounted about a pin 30, is provided to engage one of the stop lugs 28 after the readout drum has been rotated through a displacement which is analogically equal to the input and to hold the readout drum in its displaced position against the force of the zeroing spring 27. Thus it will be seen that the output reading will be preserved even after the input signal is lost or removed. Moreover, the cooperation of the restraining arm 29 and a stop lug 28 serves to ensure proper alignment of a decimal character in front of the viewing window 24*a*.

The restraining arm 29 normally is urged toward engagement with the stop lugs 28 by a restraining spring 31. Accordingly, to permit the drum to return to the "zero" position and freely rotate, to register a new output, the restraining arm is backed away from the drum by the plunger 32*a* of a release solenoid 32, which advantageously is energized by any binary coded decimal input signal. Thus the readout drum is free to rotate only when there is a signal input to the mechanism. When the input is removed, the restraining arm is immediately urged into engagement with a drum stop by the spring 31 to prevent the drum from returning to zero, thereby preserving the input information and giving the apparatus a "memory."

Figure 3:
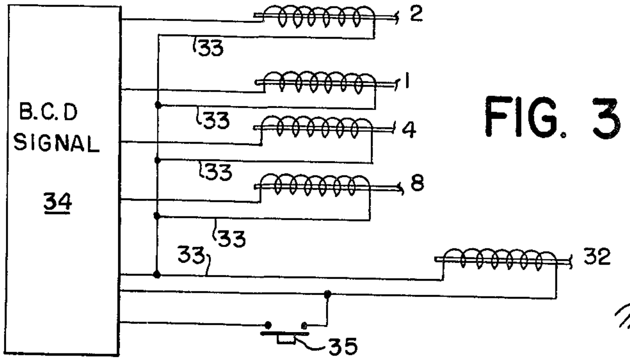
FIG. 3 is a schematic wiring diagram of the memory system of the converter illustrated in FIG. 1.

FIG. 3 shows a schematic wiring diagram for actuating the restraining arm. A common ground lead 33 connects terminals of each of the input solenoids and also the release solenoid 32, and separate terminal leads are provided for each solenoid which are adapted to be energized selectively by a control signal system indicated schematically at 34. The arrangement is such that when the separate terminal lead for any input solenoid has a signal applied thereto, an energizing signal likewise is applied to the separate terminal lead for the release solenoid 32, so that a pulse to any one of the four input solenoids will energize the release solenoid 32 to permit the free rotation of the drum 24. A pushbutton 35 is advantageously included in a circuit in parallel with the release solenoid 32 to allow it to be energized independently of the input solenoids to permit the drum to return to the zero position.

The mechanism of the present invention described hereinabove is adapted to convert binary coded decimal signals representing decimal values of one through nine. It will be evident that to achieve multi-place decimal readout one need only align several of these mechanisms, one for each decimal place required, using a four terminal array to provide the input to each converter. FIG. 2 illustrates such an arrangement wherein a series of converters is provided to accommodate the decimal readout of numbers as great as 9999. In this configuration, reference numerals 2, 36, 37, and 38 represent input solenoids of converters for units, tens, hundreds, and thousands decimal places, respectively. When a plurality of converters is used, the memory system, as is the case for a single converter, serves the additional function of ensuring proper line-up of all of the drums for easy readout. Moreover, as will be understood, a multi converter assembly, as indicated in FIG. 2, may be served by a single release solenoid 32 and restraining arm, arranged for coaction with the stop lugs 28 of all of the readout drums.

The new electromechanical system of the present invention rapidly, reliably, and directly converts binary coded decimal signals into the corresponding analogical decimal outputs, which outputs are graphically displayed and retained by the readout drum. The converter of the present invention is especially adapted for applications where retention of the decoded input information is required after the coded input signal has been lost or removed. Additionally, it provides a high degree of alignment of the readout drums through the cooperation of the drum stops and the restraining arm.

The analogical converting mechanism of the present invention may be made in extremely compact, relatively miniature sizes due to its simplicity of structure. Furthermore, advantageous economies in production are attainable without any sacrifice of performance in terms of reliability and efficiency.

Although the present invention has been described with reference to specific, preferred embodiments, it should be understood that the disclosure has been made only by way of example and that certain changes in details of construction and in the combination and arrangement of parts may be made without departing from the spirit and scope of the invention.

What is claimed is:

1. An apparatus for converting a coded voltage signal into a graphic display, comprising (a) a plurality of input solenoids having displaceable plungers, (1) said input solenoids being adapted to be selectively energized by input information in the form of coded voltages, (b) translating means to effectively weight the displacements of said plungers in predetermined ratios and to algebraically add said weighted displacements, whereby the sum of said weighted displacements represents the analogically decoded equivalent of said coded voltages, (c) a single readout drum including indicia opertively associated with said translating means and selectively rotatable to a predetermined position in which said input information is displayed graphically in decoded form at a fixed readout station adjacent said drum, (d) a series of spaced stops carried by said readout drum, (e) a first spring urging said drum in a predetermined direction, (f) a restraining element, (g) means mounting said element for movement toward and away from said drum, and (h) a second spring means urging said element toward said drum for holding engagement with the stops associated therewith, whereby said drum is restrained from rotating in said predetermined direction.

2. An apparatus according to claim 1 which includes, (a) a release solenoid connected to said restraining element, (b) a release solenoid, upon being energized, moving said restraining element away from said drum to permit the free rotation thereof.

3. An apparatus according to claim 2 which includes, (a) a first circuit means for simultaneously energizing said release solenoid when at least one of said input solenoids is energized to allow said readout drum to freely rotate through an angular displacement analogically equivalent to said input information.

4. An apparatus according to claim 3 which includes, (a) a second circuit means for energizing said release solenoid independently of said first solenoids to move said element away from said drum, thereby allowing said drum to be urged in said predetermined direction.

5. An apparatus according to claim 4 in which, (a) said restraining element is an arm, and (b) said arm is mounted for pivotal movement toward and away from said drum.

6. An apparatus for analogically converting input information in the form of coded decimal voltages into graphic decimal displays at a single readout station comprising, (a) four input solenoids having displaceable plungers adapted to be selectively energized by said coded voltages, (b) a linkage means to effectively weight the displacements of said plungers in a predetermined ratio and to add algebraically said weighted displacements, whereby the sum of said weighted displacements represents the analogically decoded equivalent of said coded voltages, (1) said predetermined ratio being such that, by selectively energizing said input solenoids, total displacements of at least 1 through 9 weighted units are attainable, (c) a single readout drum bearing indicia for visually displaying said input information graphically in decoded form at said readout station, (d) interconnecting means joining said linkage means and said readout drum, (1) said interconnecting means being adapted for actuation by said linkage means and upon being actuated causing the angular displacement of said drum, (2) said angular displacement being analogically representative of said input signal, (e) a series of ten stops on said readout drum representing the decimal characters "0" to "9" respectively, (f) a restraining element adapted to engage said stops in a holding relation, and (g) means for selectively actuating said restraining element.

7. A combination apparatus comprising a plurality of converters according to claim 1, in which (a) the drums of said converters are coaxially aligned, (b) said combination apparatus includes a single restraining element adapted to cooperate simultaneously with all of said drums.

8. An apparatus according to claim 7 which includes, (a) a release solenoid connected to said restraining element, (b) said release solenoid, upon being energized, moving said restraining element away from said drums to permit the free rotation thereof.

9. An apparatus for converting a coded voltage signal into a graphic display at a single fixed readout station, comprising (a) a plurality of input solenoids having displaceable plungers and being adapted to be selectively energized by input information in the form of coded voltages, (b) said displaceable plungers being of equal and parallel stroke, (c) linkage means actuable by said solenoids, (d) pivoted sector gear lever means actuable by said linkage means to effectively weight the displacements of said plungers in predetermined ratios and to algebraicially add said weighted displacements, whereby the sum of said weighted displacements represents the analogically decoded equivalent of said coded voltages, and (e) a single readout drum rotatably actuable by said sector gear lever means, the angular displacement of said drum being analogically representative of said input information.

10. In an apparatus for converting a coded voltage signal into a graphic display, comprising (a) a plurality of input solenoids having displaceable plungers, (1) said input solenoids being adapted to be selectively energized by input information in the form of coded voltages, (b) translating means to effectively weight the displacements of said plungers in predetermined ratios and to algebraically add said weighted displacements, whereby the sum of said weighted displacements represents the analogically decoded equivalent of said coded voltages, (c) a readout means operatively associated with said translating means to display said input information graphically in decoded form, and (d) interconnecting means joining said linkage means and said readout means, (1) said interconnecting means being adapted for actuation by said linkage means and upon said actuation causing the angular displacement of said readout means, (2) said displacement being analogically representative of said input information, the improvement wherein (e) said readout means comprises a gear actuated drum, (f) said solenoids are coplanar and include two pairs of input solenoids, each pair having an innermost and outermost solenoid, (g) said displaceable plungers are of equal stroke, and (h) said translating means comprises linkage means and a pivoted sector gear lever, (1) said sector gear lever cooperating with said readout drum to displace said readout drum a distance corresponding analogically to said input information, (i) first links pivotally joining the plungers of each pair of solenoids, (j) an integrating link pivotally joining said first links at connecting points one third the distance between the plungers of said outermost and innermost solenoids, (k) an output shaft, and (l) pin means pivotally joining said integrating link to said sector gear at a pivot point one fifth the distance from one of said connecting points to the other, (1) said sector gear lever being rotated about said output shaft, (2) said first links, integrating link, and sector gear lever being effectively coplanar, whereby said solenoids when actuated individually cause said sector gear lever to be angularly displaced, the individual displacements being in a 1:2:4:8 ratio, and (3) said integrating link adding said individual displacements of said solenoids when selectively simultaneously actuated.

11. An apparatus according to claim 10, which includes (a) a spring means urging said sector gear lever in a predetermined direction.

12. An apparatus according to claim 11, which includes (a) means for retaining said output information after said input signal has been removed.

References Cited by the Examiner

UNITED STATES PATENTS

| | | | |
|---|---|---|---|
| 2,783,464 | 2/1957 | Canepa | 340—347 |
| 2,998,596 | 8/1961 | Murphy | 340—347 |

MALCOLM A. MORRISON, *Primary Examiner.*